Patented Sept. 18, 1945

2,384,964

UNITED STATES PATENT OFFICE 2,384,964

SULPHANILYLAMINOHYDANTOIN

George W. Raiziss, Le Roy W. Clemence, and Morris Freifelder, Philadelphia, Pa., assignors to Abbott Laboratories, a corporation of Illinois No Drawing. Application April 7, 1941, Serial No. 387,260

3 Claims. (Cl. 260—239.6)

The present invention relates to chemical compositions and in particular to sulphanilamide derivatives of 5-membered heterocyclic rings containing 2 nitrogen (N) atoms. The compositions of the present invention are characterized by therapeutic properties which make them valuable agents for use in the pharmaceutical art.

The following examples will serve to illustrate the present invention.

*Example I—5-sulfanilylamino-hydantoin*

About 3 grams of 5-amino-hydantoin hydrochloride are suspended in about 1.5 cc. of pyridine and to this mixture is gradually added about 4.7 grams of p-acetamino-benzene-sulphonyl chloride. The reaction mixture is warmed on a steam bath for about 1.2 hours and the gummy mass obtained preferably allowed to stand over night. About 20 cc. of water is next added and the resulting clear solution evaporated in vacuo. The gummy solid obtained is hydrolyzed by refluxing with 50 cc. of 5 per cent sodium hydroxide for about 1.5 hours and the solution then allowed to evaporate spontaneously to a thick mass. This mass is next filtered, the solid extracted with 100 cc. of boiling absolute alcohol with heating under reflux for several hours, and the insoluble material filtered off. The filtrate is then evaporated to dryness and the final product obtained may be represented by the following formula:

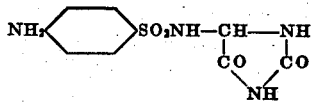

*Example II—4-sulfanilylamino-pyrazole*

About 2.4 grams of N-acetyl sulfanilyl chloride are added to about 1.56 grams of 4-amino-pyrazole dihydrochloride dispersed in about 5 cc. of pyridine and the reaction mixture warmed for about 1 hour at 60° C. Ice and water are next added along with about 5 cc. of concentrated hydrochloric acid and the clear solution formed allowed to stand, e. g. over night. The reaction mixture is then filtered and washed with cold water, and the intermediate acetyl product hydrolyzed by refluxing for about one hour with 15 cc. of N/1 NaOH in the usual manner. The hydrolyzed mixture is then cooled, neutralized with acid (HCl), cooled and filtered. The final product recrystallized from about 10 cc. of hot water may be represented by the following formula.

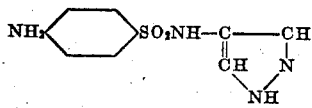

It will be understood that the present invention is not limited to the above examples. In place of the acetamino-benzene-sulphonyl chloride employed, for example, other acyl-amino-benzene-sulphonyl halides may be used to couple with the amino-5-membered heterocyclic rings. In such case the final amino products may be obtained by subjecting the acyl intermediate to a hydrolyzing reaction or deacylation treatment in accordance with standard practices.

It will be understood that the process of preparation may be modified by those skilled in the art and that the scope of the present invention is to be interpreted in the light of the claims appended hereto.

We claim:

1. The compound sulfanilylaminohydantoin having the formula

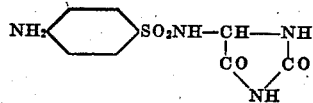

said compound being prepared for use as a therapeutic.

2. Compounds having the following linkage:

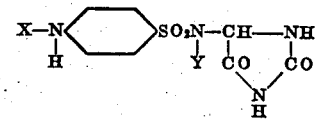

in which X is a member of the group consisting of hydrogen and acyl, and Y is a cation, prepared for use as therapeutics.

3. Compounds having the following formula:

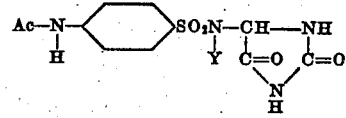

in which Ac is an acyl group and Y is a cation, prepared for use as therapeutics.

GEORGE W. RAIZISS.
LE ROY W. CLEMENCE.
MORRIS FREIFELDER.